United States Patent
Arai

[19]

[11] Patent Number: 5,877,605
[45] Date of Patent: Mar. 2, 1999

[54] SERVO DEVICE HAVING PLURAL SERVO SYSTEMS

[75] Inventor: Hiroshi Arai, Yokohama, Japan

[73] Assignee: Nikon Corporation, Tokyo, Japan

[21] Appl. No.: 795,848

[22] Filed: Feb. 5, 1997

[30] Foreign Application Priority Data

Feb. 7, 1996 [JP] Japan ................................. 8-020997

[51] Int. Cl.⁶ ................................................ G05B 11/32
[52] U.S. Cl. ..................... 318/625; 318/601; 318/619; 318/35; 318/67; 318/112
[58] Field of Search ....................... 318/625, 560, 318/562, 563, 565, 568.1–568.24, 569, 600–601, 606–608, 64, 619, 632, 677, 34–112

[56] References Cited

U.S. PATENT DOCUMENTS

| | | | |
|---|---|---|---|
| 4,146,824 | 3/1979 | Flint et al. | 318/7 |
| 4,594,539 | 6/1986 | Michelson | 318/640 |
| 4,773,025 | 9/1988 | Penkar et al. | 395/96 |
| 4,837,491 | 6/1989 | Fujioka et al. | 318/625 |
| 4,868,472 | 9/1989 | Daggett | 318/568.2 |
| 4,925,312 | 5/1990 | Onaga et al. | 395/96 |
| 5,079,490 | 1/1992 | Kita et al. | 318/625 X |
| 5,252,900 | 10/1993 | Uehara et al. | 318/568.11 |
| 5,267,142 | 11/1993 | Kono et al. | 318/625 X |

*Primary Examiner*—David Martin

[57] ABSTRACT

A servo device which simultaneously controls plural servo systems, using a digital signal processor (DSP). The servo device includes plural servo systems, plural control subjects, and plural sensors which determine control quantities of the respective control subjects. The servo device also includes a calculation processing device which finds operating amounts of the respective control subjects from the control quantities which have been detected. The calculation processing device measures the gain of each servo system, and during the gain measurement of a given servo system, drops the control band of other servo systems, or sets the other servo systems to OFF or HOLD.

13 Claims, 3 Drawing Sheets

SERVO DEVICE HAVING PLURAL SERVO SYSTEMS

CROSS REFERENCE TO RELATED APPLICATIONS

This application is based upon and claims priority from Japanese Patent Application No. 8-020997 filed Feb. 7, 1996, the contents of which are incorporated herein by reference.

BACKGROUND OF THE INVENTION

1. Field of the Invention

The present invention relates to servo devices which simultaneously control plural servo systems, using digital signal processors (DSPs) and similar calculation processing devices; and more particularly, devices which set the gains of servos, such that each servo is maintained unchanged.

2. Description of the Related Art

Servos (closed loop control systems), by applying, to a control subject, a control input comparing a target value and a control quantity from the control subject, perform control such that the target value and the control quantity are in agreement. The performance of servo systems is determined by how rapidly the control quantity reaches the target value (termed "rapidity of response" hereinbelow) and also, how stably (termed "stability" hereinbelow), the servo systems can control. In particular, what determines rapidity of response is the magnitude of the loop gain of the control system, and what determines stability is the phase margin and gain margin of the control system. From such parameters, generally through a sensor detecting the control quantity, and accurately computing the sensitivity of the control subject, the performance of the control system is increased, by determining the three parameters of loop gain, phase margin and gain margin.

However, in the control of an actuator used in an optical disc drive device, even if the gain is set accurately by determining the resonance of the actuator and the sensitivity of each unit, due to the differences in optical characteristics which accompany a change of discs, the loop gain which has been set changes. As a result, the phase margin and gain margin which determine the performance of servo system change, and the servo system has instability. Thus, the predetermined accuracy of controlling the actuator cannot be maintained.

On the other hand, in servo devices which simultaneously control plural servos using a digital signal processor (DSP) and similar calculation processing devices, the control of the plural servos causes the execution of calculation processing programs by which the gain of each servo has been set. In cases in which the gain is unsuitable, gain adjustment has to be performed by substituting a gain setting value, which has been changed in the program.

Nevertheless, when a servo device includes a DSP which has the minimum limiting performance necessary to operate plural servos simultaneously, and the process of measuring the servo gain afresh and resetting it is performed, the load of this process exceeds the processing capacity of the DSP. A problem occurs that the servo device can not set the gain. This problem may be solved if a DSP of high capacity is used, but such a high processing capacity DSP is very expensive.

SUMMARY OF THE INVENTION

Accordingly, it is an object of the present invention to provide a servo device which can reset servo gain settings even though a DSP has low processing power.

Additional objects and advantages of the invention will be set forth in part in the description which follows and, in part, will be obvious from the description, or may be learned by practice of the invention.

The foregoing and other objects of the present invention are achieved by providing a servo device which includes plural servo systems, and has plural control subjects, and plural sensors which determine control quantities of the respective control subjects, and a calculation processing device which finds operating amounts of the respective control subjects from the control quantities which have been detected. The calculation processing device measures the gain of each servo system, and during the gain measurement of a given servo system, drops the control band of other servo systems, or sets the other servo systems to OFF or HOLD.

Further, the servo device has plural actuators which correspond to the plural control subjects, and the plural sensors detect the control quantity from each control subject, which is the result of driving the actuators simultaneously or separately in time. A signal switching unit changes over signals which have been output from the sensors, and an A/D converter converts the output signals of the signal switching unit to digital signals. The servo device also has a calculation processing device which calculates control inputs, based on the output of the A/D converter, and outputs the control inputs to the actuators. The servo device includes plural servo systems respectively including the control subjects. The calculation processing device detects the phase difference between a standard frequency signal which is impressed on a given servo system and a signal which has cycled through the system. The calculation processing device measures the gain of this servo, and during this gain measurement, drops the control band for servo systems other than the current on, or sets the other servo systems to OFF or HOLD.

This kind of calculation processing device, with regard to servo systems including subjects other than the subject of gain measurement, in a range in which control does not completely become disconnected, drops the control band or sets the other servo systems to OFF or HOLD, and portions out the limited processing capacity in processes for gain measurement.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
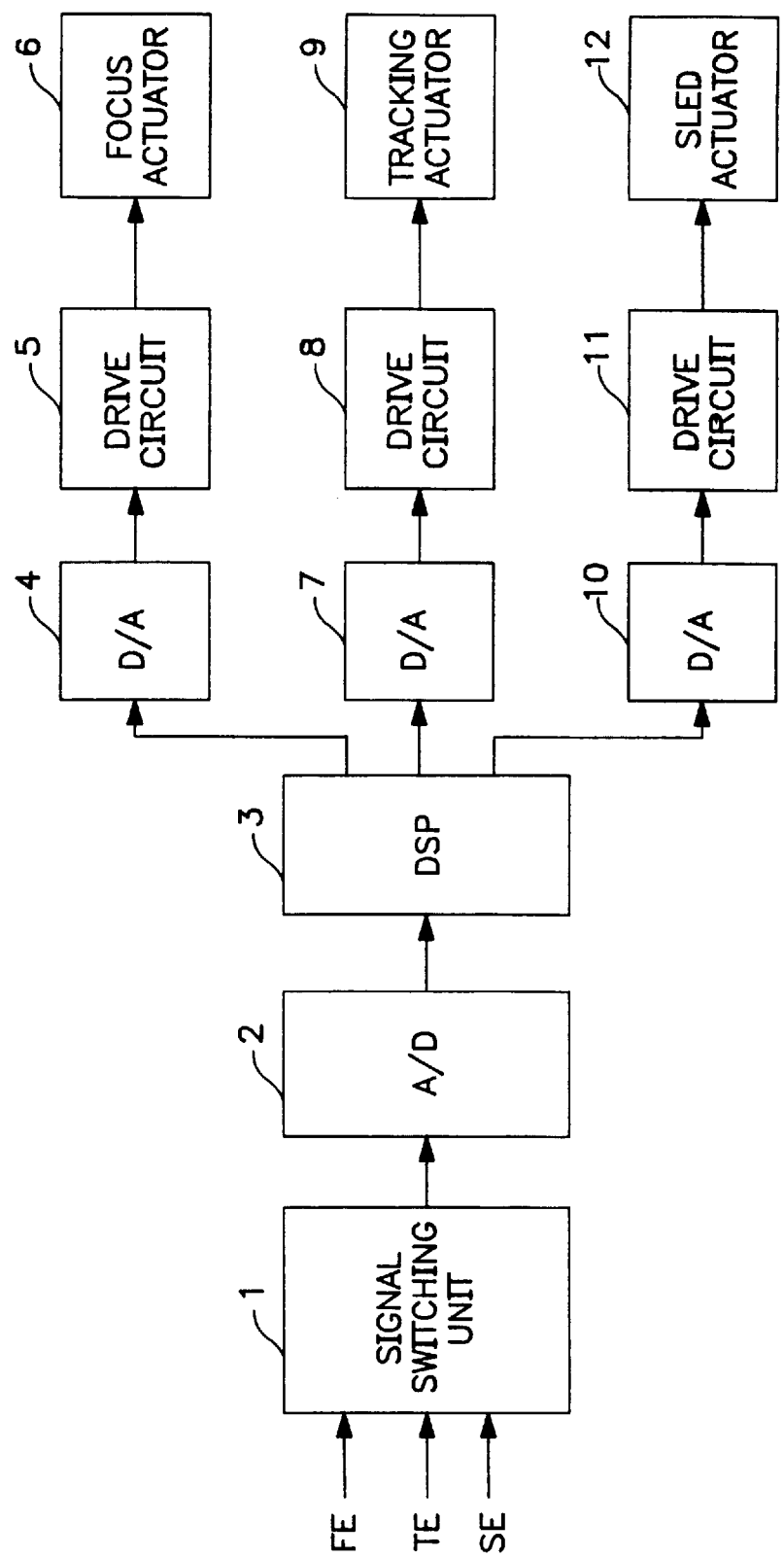
FIG. 1 is a block diagram of a servo device, showing an embodiment of the present invention.

Reference will now made in detail to the present preferred embodiments of the present invention, examples of which are illustrated in the accompanying drawings, wherein like reference numerals refer to the like elements throughout. The embodiments are described below to explain the present invention by referring to the figures.

FIG. 1 is a block diagram of a servo device, showing an embodiment of the present invention. In this embodiment, the servo device is in an optical disc drive device. An optical disc drive device is a device which projects a light beam towards an optical disc on which data are recorded, detects the intensity of the reflected light, and reads out the resulting data.

For this purpose, in an optical disc drive device, each control operation, an autofocus servo, a tracking servo and a sled servo is simultaneously performed. The autofocus servo operation keeps a focus of a light beam on the recording surface of the optical disc. The tracking servo operation causes a light beam to follow the tracks of the optical disc. After a movable unit (carriage), which includes an optical pickup, reaches a target position, the sled servo operation keeps the carriage at the target position.

Then, as mentioned hereinbelow, a focus error signal FE, a tracking error signal TE, and a sled error signal SE are obtained as signals which correspond to the control quantities from the control subjects which are the result of having driven the actuators, by using each sensor within the optical pickup (not shown in the drawing).

Using a signal switching unit 1, the signals output from these sensors, as mentioned hereinbelow, are selected according to a sampling frequency. The A/D converter 2 converts the output signals from the signal switching unit 1 into digital signals.

The DSP 3 calculates, according to each servo system, drive instruction signals which correspond to the control inputs from the output of the A/D converter 2. That is, the DSP 3, when the digital data of the focus error signals FE are input by the selection of the signal switching unit 1, calculates drive instruction signals of the autofocus servo and outputs them to the D/A converter 4. Then, according to the drive instruction signals which have been converted into analog signals, a drive circuit 5 drives a focus actuator 6.

Also, when the digital data of the tracking error signals TE are input, the DSP 3 calculates drive instruction signals of the tracking servo and outputs them to a D/A converter 7. Then, according to the drive instruction signals which have been converted into analog signals, a drive circuit 8 drives a tracking actuator 9.

Similarly, when the digital data of the sled error signals SE are input, the DSP 3 calculates drive instruction signals of the sled servo and outputs them to a D/A converter 10. Then, according to the drive instruction signals which have been converted into analog signals, a drive circuit 11 drives a sled actuator 12.

In this servo device, normally, the control band of the autofocus servo is 2 kHz, the control band of the tracking servo is 5 kHz, and the control band of the sled servo is 200 Hz. Based on the control bands, sampling of the autofocus signal FE is carried out at a sampling frequency of 50 kHz, sampling of the tracking error signal TE is carried out at 100 kHz, and sampling of the sled error signal SE is carried out at 25 kHz. Accordingly, the signal switching unit 1 synchronously performs operations such that sampling is performed at such frequencies, selects the focus error signal FE every 20 μs, selects the tracking error signal every 10 μs, and selects the sled error signal SE every 40 μs, for the processes of the DSP 3.

Figure 2:
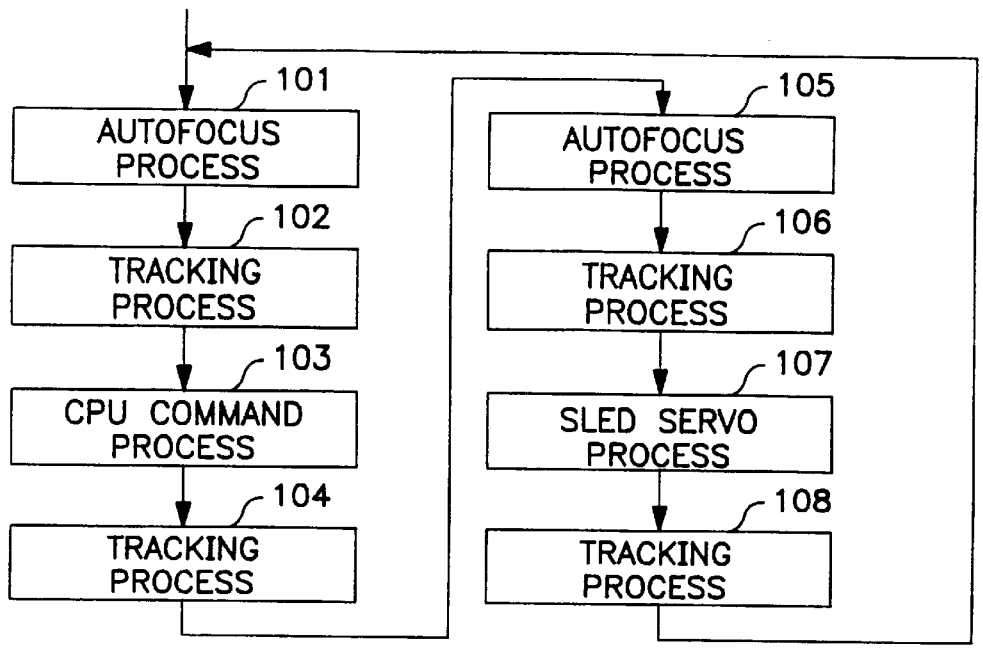
FIG. 2 is a flow chart diagram showing a time division process of a digital signal processor (DSP) in a normal time when an autofocus servo, a tracking servo, and a sled servo are normally performed.

FIG. 2 is a flow chart of the time division process of the DSP in a normal time when the optical disc drive reproduces the data recorded on the optical disc. In this mode, an autofocus servo, a tracking servo, and a sled servo operation are normally performed. One process (each step of FIG. 2) is performed every 5 μs, a total of 8 processes are repeated, in which each error signal is put to use, and a drive instruction signal is calculated. The drive signal instruction is output to the corresponding D/A converter. The DSP 3 of this mode of the embodiment, in which the processing time of 1 process takes 5 μs, is capable of sampling at a maximum of 200 kHz.

In steps 101 and 105, an autofocus process is performed, in steps 102, 104, 106 and 108 a tracking process is performed, and in step 107 a sled servo process is performed. Moreover, the CPU command process in step 103 of FIG. 2 is a process to perform communication with a CPU (host) (not shown in the drawing).

In the servo device as set forth above, for example, the control band of the autofocus servo system, namely as a way of measuring the gain, is disclosed in JP-A-5-233006.

Figure 3:
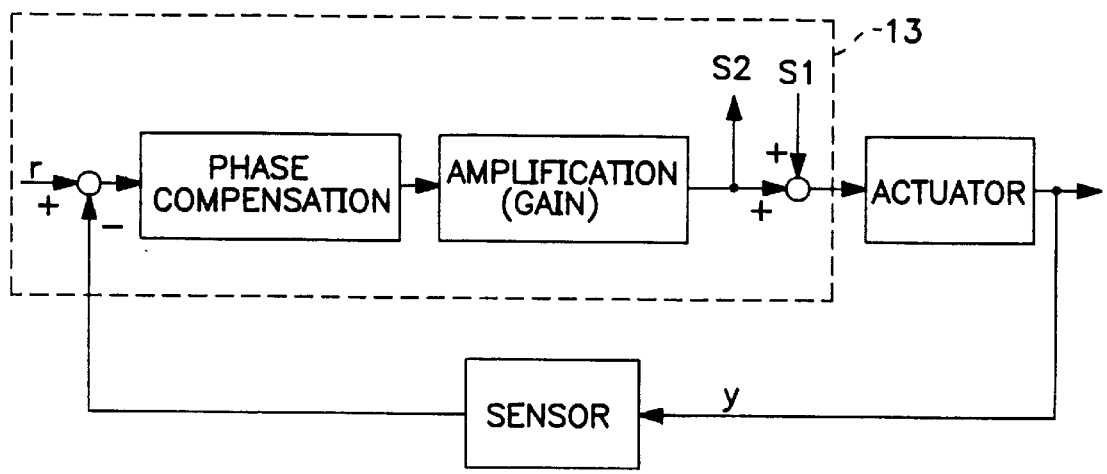
FIG. 3 is a block diagram illustrating a servo system at a time of gain measurement.

The apparatus shown in FIG. 3 adds a sine wave standard frequency signal S1 to a control loop (here, adding it to the control input which is output to the actuator). The phase difference between the signal S1 and a signal S2 which has looped the system is determined. Then, by changing the gain such that this phase difference becomes a target phase difference, the gain of the servo is found. Further, in FIG. 3, r is a target value, and y is a control quantity.

However, to find the above-mentioned phase difference, the process cannot be performed at the normal autofocus sampling frequency of 50 kHz. For example, in the case of adding a standard frequency signal S1 of 1 kHz, such as when finding a phase difference at 2° of error (resolution), because it resolves 1 cycle (360°:1 ms) each 2°, (2°/360°)×1 ms=1/180 kHz, a sampling frequency of 180 kHz becomes necessary.

Figure 4:
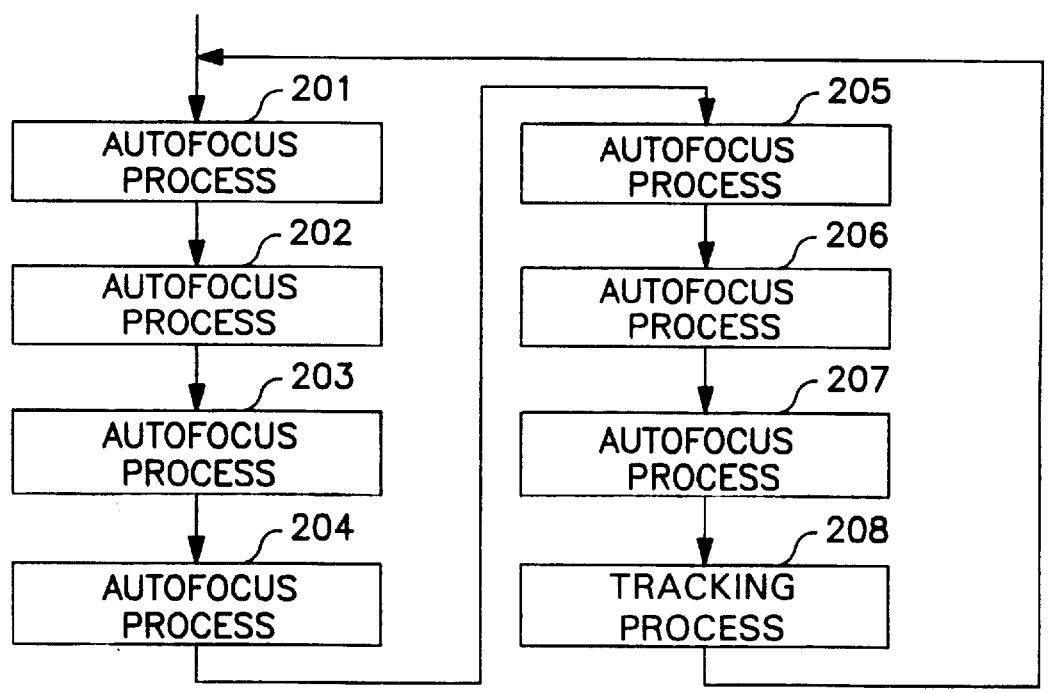
FIG. 4 is a flow chart diagram showing a time division process of a DSP at the time of gain measurement.

Consequently, in this embodiment, when the gain measurement of the autofocus servo is performed, the DSP 3 operates the time division as shown in FIG. 4. The control band of the autofocus servo is measured by the above-mentioned process.

For this purpose, the sampling of the autofocus error signal FE is raised to 125 kHz or above, the sampling of the tracking error signal TE is dropped to 25 kHz, and sampling of the sled error signal SE is stopped. The signal switching unit 1, which has been synchronized with the process of the DSP 3, changes the selection operation accompanying this process change of the DSP 3.

The DSP 3 operates in the sequence of FIG. 4 during the number of ms to find the control band of the autofocus servo in this manner. Proceeding in this manner, for the servo systems other than the one which becomes the subject of the gain measurement, the control bands are dropped, or the other servo systems are set to OFF or HOLD for a certain amount of time, and the processing capacity of the DSP 3 is portioned out to a process to measure the gain of the autofocus servo. When a servo system is set to OFF, the DSP 3 does not output the corresponding drive instruction signals, irrespective of the error signals. When the servo system is set to HOLD, the corresponding output instruction signals are held at a constant level, irrespective of the error signals.

In the time division process of FIG. 4, there is no CPU command process, but this is because of shifting to the process of FIG. 4 when the DSP 3 has received a servo gain measurement command from the CPU. Then, the DSP 3, after the end of the process of FIG. 4, returns to the normal time division process of FIG. 3, and at this time, the CPU command process is also resumed.

In this mode of the embodiment, dropping the control band of the tracking servo (thinning out the sampling intervals of the tracking signal), setting the sled servo to a HOLD state (a state in which the previously calculated gain measurement value continues to be output as the value of the drive instruction signal), and determining the sampling frequency of servo systems other than the subjects of these gain measurements is decided in a range in which the respective controls can operate without being disconnected are performed. Accordingly, it is a state in which the respective controls can operate without being disconnected.

Moreover, in the present mode of embodiment, the gain of the autofocus servo is measured, but the control system of FIG. 3 is similar for other servos, and it goes without saying that the gain of these other servos can be similarly measured.

In the control system of FIG. 3, the portion 13 corresponds to the DSP 3. Accordingly, the standard frequency S1, which is impressed during the gain measurement, may be generated by the calculation process program of the DSP 3, and a standard frequency signal generation unit (not shown in the drawing) may be arranged.

Under the present mode of the embodiment, the calculation process device, with regard to the servo system which includes subjects other than the subject of gain measurement, drops the control band in a range in which control is not disconnected, or sets the other servo systems to OFF or HOLD, because this processing capacity is portioned out to processing to measure gain. As a result, the gain of a servo can be measured and set, while keeping the plural servos as they are.

Although a preferred embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A servo device, comprising:
    a plurality of servo systems;
    a plurality of control subjects;
    a plurality of sensors to determine control quantities of respective ones of said plurality of control subjects; and
    a calculation processing device to control inputs of the respective control subjects from the control quantities;
    wherein said calculation processing device measures a gain of each servo system, and during a gain measurement of a particular one of said plurality of servo systems, drops control bands of the other servo systems, or sets the other servo systems to OFF or HOLD.

2. A servo device as claimed in claim 1, wherein said plurality of servo systems respectively control a focus error signal, a tracking error signal, and a sled error signal.

3. A servo device as claimed in claim 1, further comprising a signal switching unit alternately enable transmission of said control quantities to said calculation processing device according to a sampling frequency.

4. A servo device as claimed in claim 3, wherein said calculation processing device raises the sampling frequency of the control quantity corresponding to the particular servo system in which the gain measurement is performed and reduces or eliminates the sampling frequencies of the other servo systems.

5. A servo device as claimed in claim 4, wherein the particular servo system is an autofocus servo system and the other servo systems are a tracking servo system and a sled error servo system, and during the gain measurement of said autofocus servo system, the sampling frequency of the control quantity corresponding to said autofocus servo system is at least 125 kHz, the sampling frequency of the control quantity corresponding to said tracking error servo system is 25 kHz and the sampling frequency of the control quantity corresponding to said sled error servo system is eliminated.

6. A servo device as claimed in claim 5, wherein said calculation processing device performs a central processing unit command process to perform communication with a central processing unit when said calculation processing device is not performing gain measurement for any of said plurality of servo systems and does not perform the central processing unit command process when said calculation processing device is performing gain measurement of the particular servo system.

7. A servo device as claimed in claim 4, wherein said calculation processing device performs a central processing unit command process to perform communication with a central processing unit when said calculation processing device is not performing gain measurement for any of said plurality of servo systems and does not perform the central processing unit command process when said calculation processing device is performing gain measurement of the particular servo system.

8. A servo device, comprising:
    a plurality of actuators which correspond to a plurality of control subjects;
    a plurality of sensors to detect a control quantity from each control subject, which is a result of driving said plurality of actuators simultaneously or separately in time, and in response, outputting output signals;
    a signal switching unit to alternately enable transmission of the output signals output from said plurality of sensors;
    an A/D converter to convert the output signals transmitted from said signal switching unit to digital signals;
    a calculation processing device to calculate control inputs, based upon the digital signals output from said A/D converter, and outputs the control inputs to the corresponding ones of said plurality of actuators;
    a plurality of servo systems to control respective ones of said plurality of actuators;
    wherein said calculation processing device detects a phase difference between a standard frequency signal which is provided to a particular one of said plurality of servo systems and a cycled signal which has cycled through the particular servo system, and in response, measures a gain of the particular servo system, and during the gain measurement of the particular servo system, said calculation processing device drops control bands of the other servo systems or sets the other servo systems to OFF or HOLD.

9. A servo device as claimed in claim 8, wherein said plurality of servo systems respectively control a focus error signal, a tracking error signal, and a sled error signal.

10. A servo device as claimed in claim 8, wherein said calculation processing device raises a sampling frequency of the control quantity corresponding to the particular servo system in which the gain measurement is performed and reduces or eliminates the sampling frequencies of the other servo systems.

11. A servo device as claimed in claim 10, wherein the particular servo system is an autofocus servo system and the other servo systems are a tracking servo system and a sled error servo system, and during the gain measurement of said autofocus servo system, the sampling frequency of the control quantity corresponding to said autofocus servo system is at least 125 kHz, the sampling frequency of the control quantity corresponding to said tracking error servo system is 25 kHz and the sampling frequency of the control quantity corresponding to said sled error servo system is eliminated.

12. A servo device as claimed in claim 11, wherein said calculation processing device performs a central processing unit command process to perform communication with a central processing unit when said calculation processing device is not performing gain measurement for any of said plurality of servo systems and does not perform the central processing unit command process when said calculation processing device is performing gain measurement of the particular servo system.

13. A servo device as claimed in claim 10, wherein said calculation processing device performs a central processing unit command process to perform communication with a central processing unit when said calculation processing device is not performing gain measurement for any of said plurality of servo systems and does not perform the central processing unit command process when said calculation processing device is performing gain measurement of the particular servo system.

* * * * *